United States Patent Office 2,847,301
Patented Aug. 12, 1958

2,847,301

PROCESS OF PRODUCING STAINLESS STEEL

Richard B. Shaw, Tarentum, Pa., assignor to Allegheny Ludlum Steel Corporation, Brackenridge, Pa., a corporation of Pennsylvania No Drawing. Application June 10, 1955
Serial No. 514,771

3 Claims. (Cl. 75—130.5)

This invention relates to improvements in the method of producing stainless steel and in particular to improvements in the method of producing stainless steel by the oxidation-reduction method which steel is substantially free from refractory oxide inclusions.

The oxidation-reduction method of producing stainless steel has been known and practiced for quite some time. It consists essentially of melting scrap material together with certain oxidizable elements such as high carbon ferro-chromium under a slag cover. Iron ore is introduced into the molten metal bath whereby the elements silicon, manganese, chromium and carbon are sequentially oxidized in that order forming their respective metallic oxides, the metallics, when oxidized, floating out of the molten metal bath and into the slag. The carbon forms carbon monoxide and carbon dioxide gases which are dissipated. When the carbon content has been reduced to a predetermined value, the oxidized metallics in the slag are reduced with the aid of a powerful reducing agent usually ferrosilicon, in order to recover the oxidized metallics from the slag as metal within the molten metal bath.

Modern trends have witnessed the use of injections of gaseous oxygen in place of the use of iron ore to reduce the carbon content of the molten bath to the desired predetermined value. However, an inherent difficulty of the inclusion of high percentages of dissolved oxygen in the melt is found to exist where either iron ore or gaseous oxygen or a combination of both is used to reduce the carbon content of the melt. This difficulty arises through the ultimate formation of refractory oxides within the molten metal when the reducing agent is introduced into the slag in order to reduce the oxidized metallics contained therein. The refractory oxides are formed through deoxidation of the molten metal bath. The reducing agent usually has a high diffusion rate whereby the addition of the reducing agent to the slag finds an invariable diffusion of a portion of the reducing agent into the molten metal bath. At this point in the process, as described hereinbefore, the molten metal bath contains high percentages of dissolved oxygen together with dissolved metallic oxides in the molten metal bath it reacts with the dissolved oxygen contained therein thereby arresting the carbon-oxygen reaction and combines with the dissolved oxygen forming the respective oxide of the reducing agent. When ferro-silicon is used, as the reducing agent, the reaction with the dissolved oxygen in the melt results in the formation of silica, a high melting refractory oxide. Since these refractory oxide particles are solid at the temperature of the molten metal bath and do not coalesce, it is difficult for them to float out of the metal bath and into the slag. As a result, the subsequently solidified refined molten metal shows a high degree of inclusions which are found to be the oxides of the reducing agent used to reduce the oxidized metallics in the slag.

An object of this invention is to provide a method of producing stainless steels by the oxidation-reduction method which steels are substantially free from refractory oxide inclusions therein.

A more particular object of this invention is to provide a method for producing stainless steel by the oxidation-reduction method in which a manganese-silicon master alloy is added to the molten metal bath and the slag together with sufficient reducing agents at the end of the oxidation period with an accompanying lowering of the temperature of the molten metal bath to remove the dissolved oxygen contained therein and reduce the oxidized metallics of the slag while maintaining the molten metal bath substantially free from refractory oxide inclusions.

These and other objects of this invention will become apparent to one skilled in the art when read in conjunction with the following description.

In its broader aspects, the process of this invention contemplates melting scrap material and/or hot metal under a slag cover in an electric arc carbon electrode furnace to form a molten metal bath. Oxygen is injected into the molten metal bath in a manner well known to the industry until the carbon content is reduced to a predetermined low value, the melt then having a temperature in excess of 2900° F. At the end of the oxidation period, a manganese-silicon master alloy, cooling scrap and sufficient reducing agents are introduced into the furnace in order to respectively deoxidize the molten metal, lower the temperature and reduce the oxidized metallics from the slag into the molten metal. The addition of such materials and/or cooling scrap and/or refurnacing of the contents of the furnace effectively reduces the temperature of the molten metal bath to a temperature in the range between 2750° F. and 2850° F. When the reaction between the reducing agents and the oxidized metallics is substantially complete and the reduced metallics have flowed from the slag into the molten metal, the slag is decanted and sufficient alloying elements and a new slag are added to obtain the desired chemical analysis and protect the molten metal respectively.

More particularly, the process of this invention may be carried out by melting scrap material and/or molten metal in an electric arc furnace. The details of such melting are well known in the art and will not be described in detail. The scrap material employed may be the common scrap variety known to the trade as "Low Phos OHM" or stainless steel scrap depending upon the composition desired in the end product. However, care must be taken to insure that the initial scrap does not contain more than the required amount of non-oxidizable metals for example, nickel, copper, cobalt and the like. The scrap material and/or hot metal are arc melted to form a molten metal bath which usually attains a temperature of at least 2700° F. The molten metal bath is preferably maintained under a highly basic slag consisting predominantly of burnt lime and fluorspar. In order to reduce the carbon content of the molten metal, a predetermined amount of gaseous oxygen is introduced as by the lance method into the molten metal bath whereby the silicon, manganese, chromium and carbon are sequentially oxidized in that order. With the oxidation of the foregoing elements, substantial amounts of heat are evolved which raises the temperature of the molten metal bath to above 2900° F. and usually to a temperature of between about 3100° F. and 3400° F. It will be appreciated, however, that the temperature attained by the molten metal bath will be governed predominantly by the amount of oxygen delivered to the molten metal bath and the amount of oxidizable elements contained therein. The oxygen injection is continued until the carbon content reaches a predetermined low level in the range of between about 0.015% and 0.30% carbon depending upon the amount of carbon desired in the final analysis. At this point a considerable amount of chromium, of the initially melted metal bath, has been oxidized to form chromium oxide which has floated out of the molten metal and into the slag. Also, the molten metal bath contains a high percentage of dissolved oxygen, which percentage substantially increases with the increase in temperature of the molten metal bath. It is thus necessary, from an economic viewpoint, to recover the metal of the chromium oxide contained in the slag and cause such metal to flow into the molten metal bath.

In accordance with the invention a master alloy of manganese and silicon is introduced into the molten metal bath together with scrap material and a strong reducing agent to effect the deoxidation of the molten metal, lowering of the temperature and the reduction of the metallic oxides in the slag and an efficient recovery of the metal thereof in the melt. As practiced heretofore only the strong reducing agents such as silicon, aluminum, titanium, zirconium or the like, usually although not necessarily in the ferro alloy form, were added to the furnace to combine with the oxygen of the chromium oxide thereby reducing it to the metallic form of chromium and causing such metal to descend from the slag into the molten metal. However, since there was considerable oxygen contained in the molten metal bath from the injection of gaseous oxygen and because of the high temperature at which the bath was maintained during the oxidation period, some of the reducing agent went into the molten metal bath because of its high diffusion rate and united with the dissolved oxygen contained therein to form the respective oxide of the reducing agent. If the reaction between the reducing agent and the chromium oxide in the slag could be maintained completely within the slag strata within the furnace, the required recovery of chromium could be had without any adverse effect upon the molten metal bath; however, presently known reducing agents have such a high diffusion rate which is accentuated at the temperatures of the molten metal bath at this point in the process, that it is substantially impossible to confine the reaction to the slag strata within the furnace with the result that a portion of the reducing agent diffuses into the molten metal bath.

The effect of the diffusion of the reducing agent into the molten metal bath which at this point in the process contains high amounts of oxygen, is to form the respective oxide of the reducing agent. Hence particles of silicon dioxide, manganese oxide, titanium dioxide, zirconium dioxide and the like, depending upon the reducing agent used, will be formed within the molten metal bath. This in effect deoxidizes the molten metal bath and arrests the carbon-oxygen reaction. The oxide of the reducing agent which has thus been formed exists in the bath in a physical state dependent upon the temperature of the molten metal bath. As was stated hereinbefore, the molten metal bath at this point in the process may attain the temperature as high as 3400° F. However, the oxides of the presently known reducing agents in use at the present time shows that most of such binary oxides are in a solid state at the temperature of the molten metal bath. Since these solid state particles do not coalesce, it is difficult for them to float out of the molten metal and into the slag. Thus when the molten metal is refined to its desired analysis and cast into ingots, the subsequently solidified metal contains a high percentage of the above identified oxides which accounts for the "dirty steel."

Instead of following such prior art practice, I have found that a "clean steel" will result where predetermined amounts of a master alloy of manganese and silicon in the ratio of 2 to 4 parts by weight of manganese to 1 part by weight of silicon is added to the molten metal bath followed by the addition of the scrap material for cooling the bath followed by the addition of the strong reducing agent for effecting the deoxidation, cooling the metal bath to about 2800° F. and the reduction of the metallic oxides of the slag respectively. Further cooling will also be realized when the contents of the furnace are tapped into the refurnacing ladle.

As stated hereinbefore, the master alloy of manganese and silicon which is added to the melt contains about 2 to 4 parts by weight of manganese to 1 part by weight of silicon with not more than .06% carbon and .05% phosphorous. While it would seem that the same result, that is "clean steel," could be obtained by the simultaneous addition of the same proportions of manganese and silicon each in its own form and without adverting to the use of manganese and silicon master alloy, such is not the case. It has been found that the process of this invention cannot be performed to obtain the desired result of a "clean steel" when simultaneous additions of manganese and silicon in their individual forms are added in a manner sufficient to maintain at least a 2 to 1 ratio of manganese to silicon in the melt because the diffusion rates of the manganese and silicon are different and the individual elements of manganese and silicon will form the simple binary oxide instead of the complex manganese-silicon-oxide. The result of the formation of the binary oxide of each element is "dirty steel" because the binary oxide is solid at the temperature at which the melt is maintained and the solid binary oxide will not float out of the molten metal bath and into the slag. From the foregoing it is apparent that the manganese and silicon must be added to the melt in the form of a master alloy.

In adding the master alloy, the amount to be added is computed such that the combined weight of the silicon which is available to unite with the oxygen from both the reducing agent and the master alloy will maintain a ratio of manganese to silicon of at least 2 to 1 within the molten metal bath. With the temperature of the molten metal bath maintained at a temperature below 2900° F. and preferably in the range between 2750° F. and 2850° as referred to hereinbefore until the reaction between the reducing agent and the chromium oxide in the slag is substantially complete, it is found that the metallic chromium thus formed through the reduction of chromium oxide descends from the slag into the molten metal and is thus recovered. At this point in the process the slag is worthless and may be decanted.

I have found that the additions of the master alloy either simultaneously with or prior to the addition of the reducing agents with the lower temperature of the metal bath effects an efficient recovery of the chromium contained in the slag in the oxide form and substantially deoxidizes the molten metal bath through the formation of a low melting complex manganese-silicon-oxide. This low melting oxide is liquid at temperatures as low as 2750° F. and in that form, the low melting complex manganese-silicon-oxide will coalesce upon contact with similar oxides and thus float out of the metal and into the slag.

It is essential that the bath be cooled at substantially the same time that the master alloy is added to the molten metal bath followed thereby with the addition of the reducing agent in order to reduce the solubility of the oxygen within the molten metal bath before the reducing agent has an opportunity to diffuse into the melt. While it will be appreciated from the foregoing that it may be implied that the action of the reducing agent is confined to the slag strata and the reaction of the master alloy is confined to the molten metal bath, it will be appreciated that in actual practice such is not the case. Since both manganese and silicon are reducing agents there will undoubtedly be some reaction within the slag strata in which chromium oxide is reduced to metallic chromium. By the same token a portion of the reducing agent referred to hereinbefore will invariably diffuse into the molten metal bath combining with the dissolved oxygen contained therein, thereby forming the respective oxide of the reducing agent. While the respective reductions and diffusions cannot be controlled, it is essential that a ratio of 2 to 1 of the manganese to silicon be maintained within the molten metal bath before the reducing agent diffuses into the melt in order to insure that a low melting complex manganese-silicon-oxide is formed thereby insuring the results of the process of this invention, namely, a "clean steel" substantially free of refractory oxide inclusions. For this reason, it is preferred to add the master alloy first so that it will have an opportunity to substantially diffuse throughout the melt thereby providing the necessary minimum of at least 2 to 1 ratio of manganese to silicon so that when the addition of the reducing agent is made, the invariable diffusion of a portion thereof will find the oxygen content of the melt at such a low level that the refractory oxide particles will not form. While the foregoing practice will insure the results of this invention, if the additions of the master alloy of manganese and silicon, scrap material and the reducing agent are added simultaneously to the furnace, substantially the results, that is, "clean steel," can be obtained provided that the master alloy is below the scrap material and the reducing agents are on top of the scrap when they are simultaneously added into the furnace.

In order to more clearly illustrate the process of this invention, reference may be had to the following procedure which was followed in the production of a heat of type 304 stainless steel using the oxidation-reduction melting procedure. This heat was for the production of 110,000 lbs. which was made in an electric arc furnace.

The initial charge consisted of 80,000 lbs. of stainless steel scrap of the 18–8 type, 3,000 lbs. of nickel oxide, 6,000 lbs. of silicon steel scrap, 5,000 lbs. of mill scale, 6,000 lbs. of burnt lime and 7,600 lbs. of high carbon ferro-chromium. The foregoing materials were melted in an electric arc furnace until a molten metal bath had formed having a slag covering thereon. When the temperature had reached approximately 2750° F. oxygen was injected at the rate of 120 lbs. per square inch for 50 minutes. At this point in the process the molten metal was sampled and was found to contain about 0.076% carbon, 0.37% manganese, about 0.02% silicon, about 13% chromium, about 9.8% nickel, about 0.12% molybdenum and the balance iron. Since part of the desired analysis required the carbon content to be about 0.07%, the oxygen injection was continued for an additional 21 minutes at 120 lbs. per square inch pressure. Since by experience it was known that the carbon content would be within the required range, after such treatment the injection of oxygen was then stopped. At this point 4000 lbs. of the manganese-silicon master alloy containing about 67% manganese and 33% silicon by weight was added to the furnace followed by 2,500 lbs. of low carbon ferro-chromium plus 15,000 lbs. of 18–8 type stainless steel scrap material and then 5,600 lbs. of chromsilicide (40% chromium, 45% silicon, 15% iron). When the temperature dropped to about 2800° F. the contents of the furnace was tapped into a refurnacing ladle. At this point in the process the molten metal bath was deoxidized, the temperatures lowered and most of the chromium oxide which was contained in the slag was reduced to chromium metal which descended from the slag and into the molten metal. The molten metal and the slag contained thereon was held in the refurnacing ladle for approximately 20 minutes. The slag was then decanted and the molten metal returned to the furnace. At this point in the process the molten metal had an analysis of 0.069% carbon, 1.4% manganese, 0.54% silicon, 18.66% chromium, 8.96% nickel, 0.22% molybdenum and the balance iron. New slag forming materials were added onto the molten metal bath and the final additions of the alloying elements were made to attain the desired analysis of each element. When the required temperature of about 2800° F. was attained and the other auxiliary physical tests proved satisfactory, the molten metal was tapped into a teeming ladle from which it was cast into ingots. These ingots, when solidified, proved to be remarkably free from refractory oxide inclusions.

Thus from the foregoing illustration of process of the invention, the requisite chromium was recovered from the slag into the molten metal while at the same time the molten metal bath was deoxidized, without the formation of large amounts of refractory oxide inclusions and hence "dirty steel." It is to be noted also that this process does not make use of any elements foreign to the desired analysis. All of the additions made to accomplish the desired result are readily available and are substantially low in cost. No exceptional handling is required of these metals since all are common to the industry and its presently practiced process.

I claim:

1. In the process of producing stainless steel substantially free from refractory oxide inclusions by the oxidation-reduction method in which gaseous oxygen is utilized in the melt under a slag cover to effectively lower the carbon content to a predetermined value, the gaseous oxygen also effecting oxidation of a portion of the chromium of the melt while increasing the temperature of the melt to above 2900° F. and the chromium oxide being thereafter reduced from the slag into the melt, the improvement comprising, introducing a master alloy consisting of manganese and silicon in the proportion of from 2 to 4 parts by weight of manganese to 1 part by weight of silicon into the melt and the slag cover therefor at the end of the oxidation period, cooling the melt to a temperature in the range between 2750° F. and 2850° F. and thereafter adding sufficient reducing agents to effectively reduce the chromium oxide from the slag, the master alloy being introduced in an amount equal to at least an amount required to combine with the dissolved oxygen of the melt while maintaining at least a 2 to 1 ratio of manganese to silicon in the melt, maintaining the melt at a temperature in the range between 2750° F. and 2850° F. until the reducing agent effectively reduces the chromium oxide of the slag and the reduced chromium returns to the melt, decanting the slag cover, and thereafter adding a new slag and additional chromium to obtain a predetermined analysis of the steel substantially free from refractory oxide inclusions.

2. In the process of producing stainless steel substantially free from refractory oxide inclusions by the oxidation-reduction method in which gaseous oxygen is utilized in the melt under a slag cover to effectively lower the carbon content to a predetermined value, the gaseous oxygen also effecting oxidation of a portion of the chromium of the melt while increasing the temperature of the melt to above 2900° F. and the chromium oxide being thereafter reduced from the slag into the melt, the improvement comprising, introducing a master alloy consisting of manganese and silicon in the proportion of from 2 to 4 parts by weight of manganese to 1 part by weight of silicon into the melt and slag cover therefor at the end of the oxidation period, cooling the melt to a temperature in the range between 2750° F. and 2850° F. by the addition of scrap to the melt and adding sufficient reducing agents to effectively reduce the chromium oxide from the slag, the manganese and silicon of the master alloy simultaneously diffusing into the melt in an amount equal to at least an amount required to combine with the dissolved oxygen of the melt and to maintain at least a 2 to 1 ratio of manganese to silicon content in the molten metal whereby a low melting manganese-silicon oxide will form and coalesce and float into the slag cover, maintaining the melt at a temperature in the range of 2750° F. to 2850° F. until the reducing agent effectively reduces the chromium oxide of the slag and the reduced chromium returns to the melt, decanting the slag cover, and thereafter adding a new slag and additional chromium to obtain a predetermined analysis of the steel substantially free from refractory oxide inclusions.

3. In the process of producing stainless steel substantially free from refractory oxide inclusions by the oxidation-reduction method in which gaseous oxygen is utilized in the melt under a slag cover to effectively lower the carbon content to a predetermined value, the gaseous oxygen also effecting oxidation of a portion of the chromium of the melt while increasing the temperature of the melt to above 2900° F. and the chromium oxide is thereafter reduced from the slag into the melt, the improvement comprising, substantially simultaneously introducing a master alloy consisting of manganese and silicon in the proportion of from 2 to 4 parts by weight of manganese to 1 part by weight of silicon together with sufficient cooling scrap and a reducing agent into the melt and slag cover therefore at the end of the oxidation period, the master alloy being introduced in an amount equal to at least an amount required to combine with the dissolved oxygen of the melt while maintaining at least a 2 to 1 ratio of manganese to silicon to form a low melting manganese-silicon oxide which will coalesce and float into the slag cover, the cooling scrap being sufficient to reduce the temperature of the melt to a temperature in the range between 2750° F. and 2850° F., maintaining the melt in that temperature range until the reducing agent effectively reduces the chromium oxide of the slag and the reduced chromium returns to the melt, decanting the slag cover, and thereafter adding a new slag and additional chromium to obtain a predetermined analysis of the steel substantially free from refractory oxide inclusions.

References Cited in the file of this patent

FOREIGN PATENTS

| | | |
|---|---|---|
| 514,428 | Great Britain | Nov. 8, 1939 |
| 533,703 | Great Britain | Feb. 19, 1941 |

OTHER REFERENCES

The Manufacture of Iron and Steel, vol. 2 (Bashforth) Chapman and Hall Ltd. (London) 1951. (Page 215 relied on.)